United States Patent
Nuita

(10) Patent No.: US 9,894,228 B2
(45) Date of Patent: Feb. 13, 2018

(54) IMAGE PROCESSING APPARATUS AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Akira Nuita, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/729,192

(22) Filed: Jun. 3, 2015

(65) Prior Publication Data

US 2016/0360055 A1  Dec. 8, 2016

(51) Int. Cl.
  *G06K 15/00*  (2006.01)
  *G06T 5/00*  (2006.01)
  *H04N 1/04*  (2006.01)
  *H04N 1/00*  (2006.01)

(52) U.S. Cl.
  CPC ..... *H04N 1/00684* (2013.01); *H04N 1/00724* (2013.01); *H04N 1/00761* (2013.01); *H04N 1/00779* (2013.01)

(58) Field of Classification Search
  CPC ................................................ H04N 1/00684
  See application file for complete search history.

(56) References Cited

U.S. PATENT DOCUMENTS

| | | | | |
|---|---|---|---|---|
| 5,999,275 A | * | 12/1999 | Hagihara | H04N 1/00681 358/449 |
| 2004/0100669 A1 | * | 5/2004 | Tecu | H04N 1/121 358/497 |
| 2006/0159508 A1 | * | 7/2006 | Mori | B41J 11/663 400/621 |
| 2007/0253007 A1 | * | 11/2007 | Nakai | G03G 15/36 358/1.2 |
| 2008/0018954 A1 | * | 1/2008 | Ueno | H04N 1/02815 358/474 |
| 2012/0013957 A1 | * | 1/2012 | Honda | H04N 1/00551 358/498 |
| 2012/0019874 A1 | * | 1/2012 | Schaertel | H04N 1/00588 358/474 |
| 2013/0155448 A1 | * | 6/2013 | Link | H04N 1/00716 358/1.15 |

FOREIGN PATENT DOCUMENTS

JP  2007216515 A  *  8/2007
JP  2015182267 A  *  10/2015

* cited by examiner

*Primary Examiner* — Cheukfan Lee
(74) *Attorney, Agent, or Firm* — Amin, Turocy & Watson LLP; Gregory Turocy

(57) ABSTRACT

According to one embodiment, there is provided an image processing apparatus including a reading unit and a determining unit. The reading unit generates sheet image data indicating image data of a sheet. The determining unit determines, on the basis of a degree of gradation in the sheet image data generated by the reading unit, whether a planar object adheres on the sheet read by the reading unit.

9 Claims, 9 Drawing Sheets

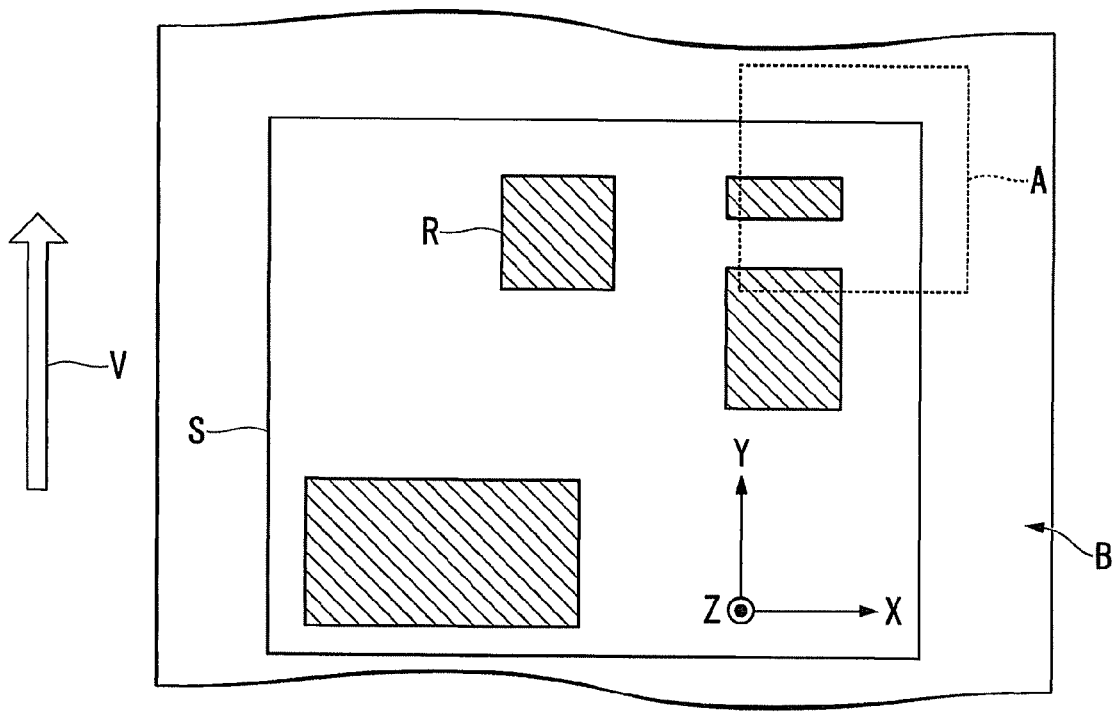

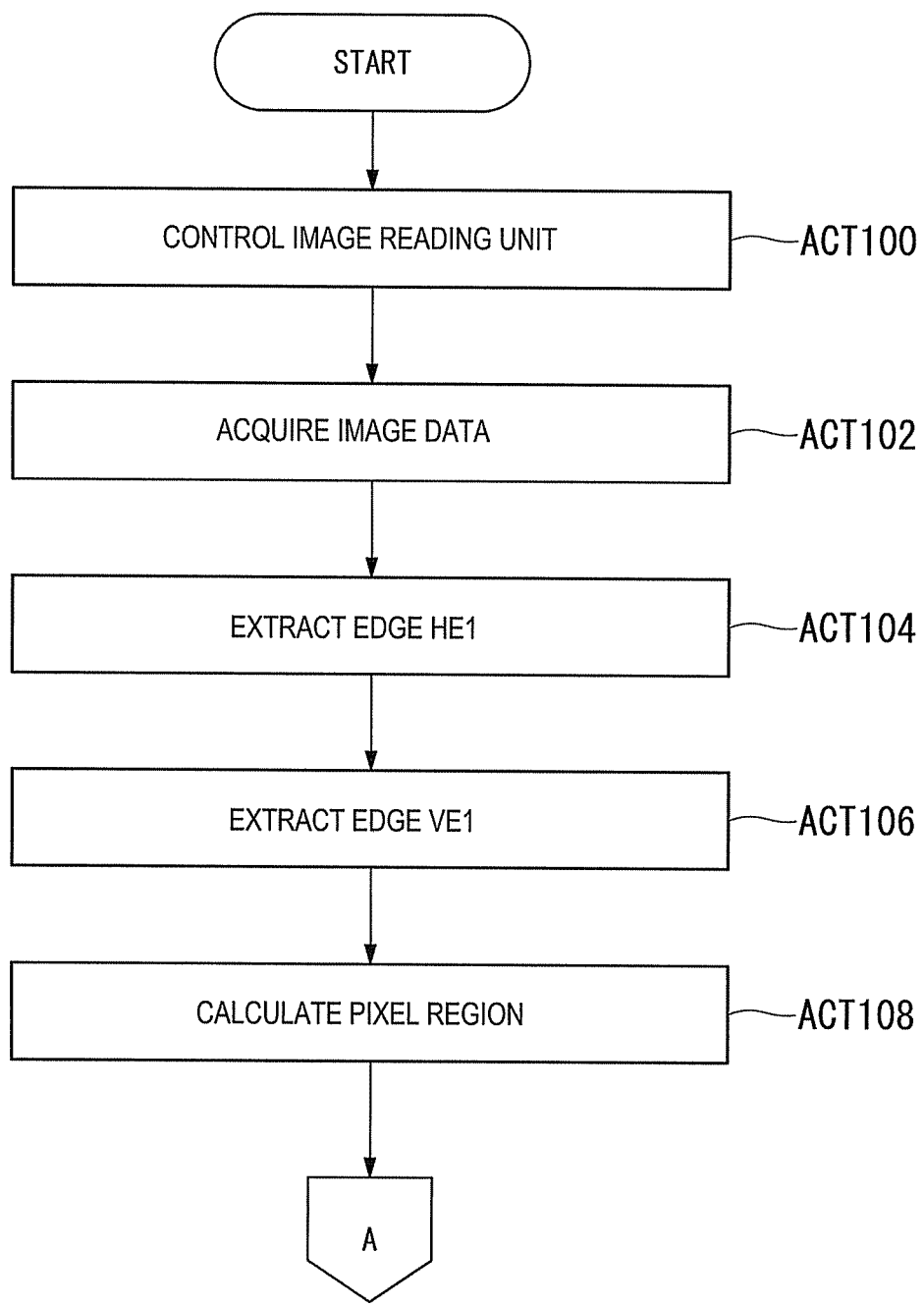

US 9,894,228 B2

IMAGE PROCESSING APPARATUS AND IMAGE FORMING APPARATUS

FIELD

Embodiments described herein relate generally to an image processing apparatus and an image forming apparatus.

BACKGROUND

There is known a technique for reading an image formed on a sheet-like medium (hereinafter referred to as "sheet") such as paper. On the other hand, a planar object such as a label is sometimes stuck to the sheet. If the planar object is stuck to the sheet, in the related art, the sheet to which the object is stuck and a sheet to which the object is not stuck sometimes cannot be distinguished.

DESCRIPTION OF THE DRAWINGS

FIG. 6 is a diagram showing a state in reading the sheet on a predetermined conveying route;

FIG. 7 is a diagram showing sheet image data obtained by representing pixels in binary values as a processing result of an extracting unit;

FIG. 8 is a flowchart for explaining an example of a flow of a partial operation of the image processing apparatus in the first embodiment;

DETAILED DESCRIPTION

In general, according to one embodiment, there is provided an image processing apparatus including a reading unit and a determining unit. The reading unit generates sheet image data indicating image data of a sheet. The determining unit determines, on the basis of a degree of gradation in the sheet image data generated by the reading unit, whether a planar object adheres on the sheet read by the reading unit.

Exemplary embodiments are explained below with reference to the drawings.

Figure 1:
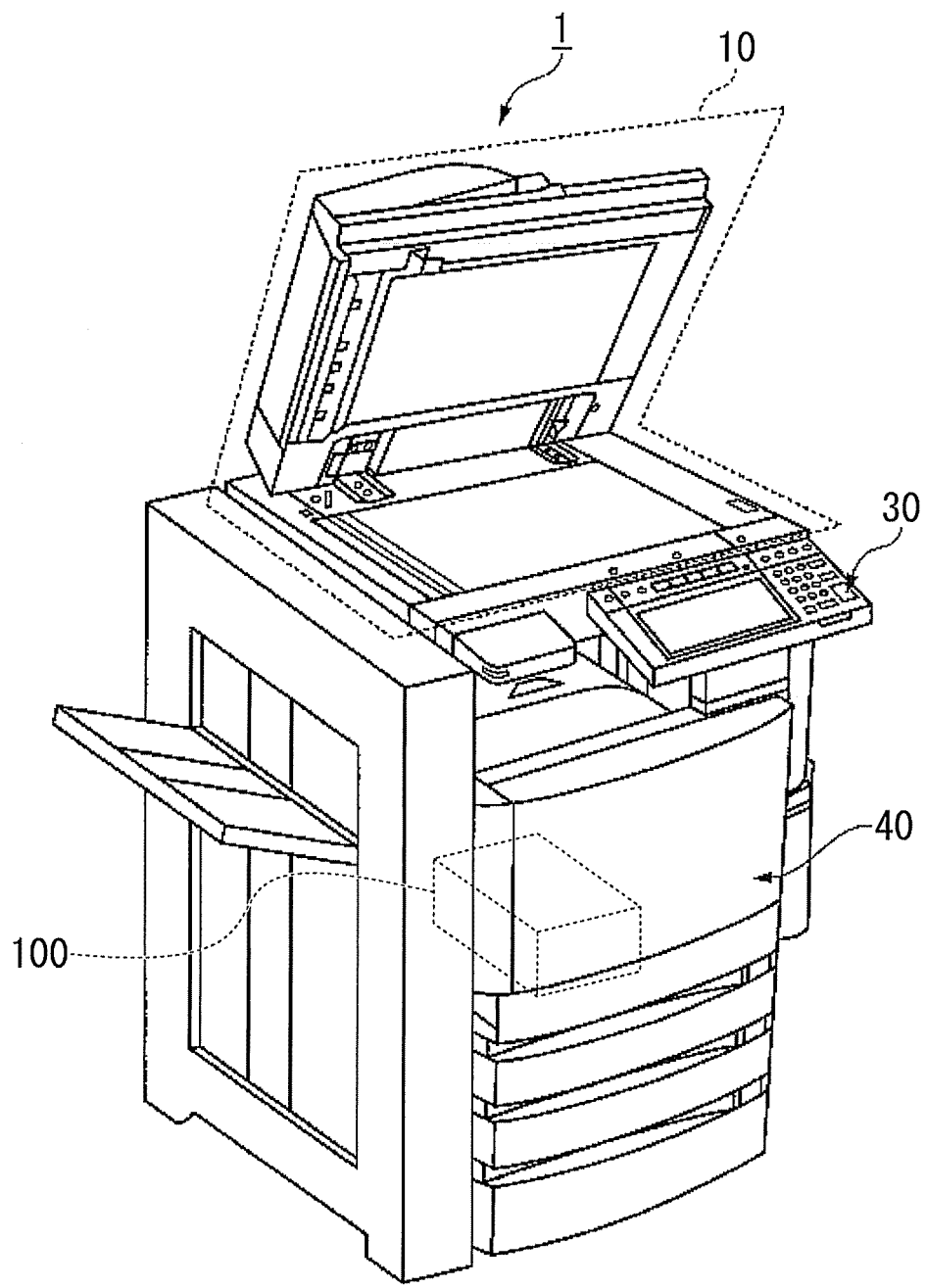
FIG. 1 is a diagram showing an example of the external appearance of an image forming apparatus including an image processing apparatus in a first embodiment.

FIG. 1 is a diagram showing an example of the external appearance of an image forming apparatus 1 including an image processing apparatus 100 in a first embodiment.

The image forming apparatus 1 is a multifunction printer (MFP) that can form an image on a sheet S. For example, the image forming apparatus 1 has a print function, a copy function, a scan function, or a facsimile function. For example, the sheet S is paper on which an original document, characters, pictures, and the like can be formed. The sheet S may be any object as long as the image forming apparatus 1 can form an image on the object.

The image forming apparatus 1 includes an image reading unit 10, a control panel 30, an image forming unit 40, and an image processing apparatus 100. Note that the image reading unit 10 is an example of a "reading unit".

The image reading unit 10 reads an image from a sheet placed in a predetermined position. For example, the image reading unit 10 includes an image pickup device such as a CCD or a CIS. The CCD is an abbreviation of "Charge Coupled Device". The CIS is an abbreviation of "Contact Image Sensor". The image reading unit 10 generates image data from the read image and outputs the generated image data to the image processing apparatus 100. In the following explanation, the image data generated by the image reading unit 10 is described as "sheet image data". Note that a planar object having predetermined thickness is sometimes stuck to the sheet S in this embodiment. In the following explanation, it is assumed that the planar object having the predetermined thickness is stuck to the sheet S. In the following explanation, the planar object having the predetermined thickness is described as "label R".

The control panel 30 functions as a user interface that receives an operation input from a user. The control panel 30 includes, for example, a touch panel in which an operation unit and a display unit are integrally formed. The control panel 30 is communicably connected to the image processing apparatus 100. For example, the operation unit of the control panel 30 receives an instruction for the operation of the image forming apparatus 1. For example, the instruction for the operation includes an instruction for a scan function for performing reading of an image. For example, the instruction for the operation includes an instruction for a copy function for printing a predetermined image on a sheet. After receiving an operation input, the control panel 30 generates an operation signal based on the operation input.

The display unit of the control panel 30 displays information to the user. For example, the display unit of the control panel 30 displays a determination result of a determining unit 124.

The image forming unit 40 forms an image on the sheet S using a coloring agent such as toner or ink. Specifically, the image forming unit 40 forms an image on the basis of the sheet image data read by the image reading unit 10 or image data received from an external apparatus. For example, the image forming unit 40 forms an image on the sheet S using an inkjet system, a laser system, or a thermal system.

The image processing apparatus 100 is a computer that applies various image processing to the acquired image data. The image processing apparatus 100 appropriately controls the image reading unit 10 and the image forming unit 40.

Figure 2:
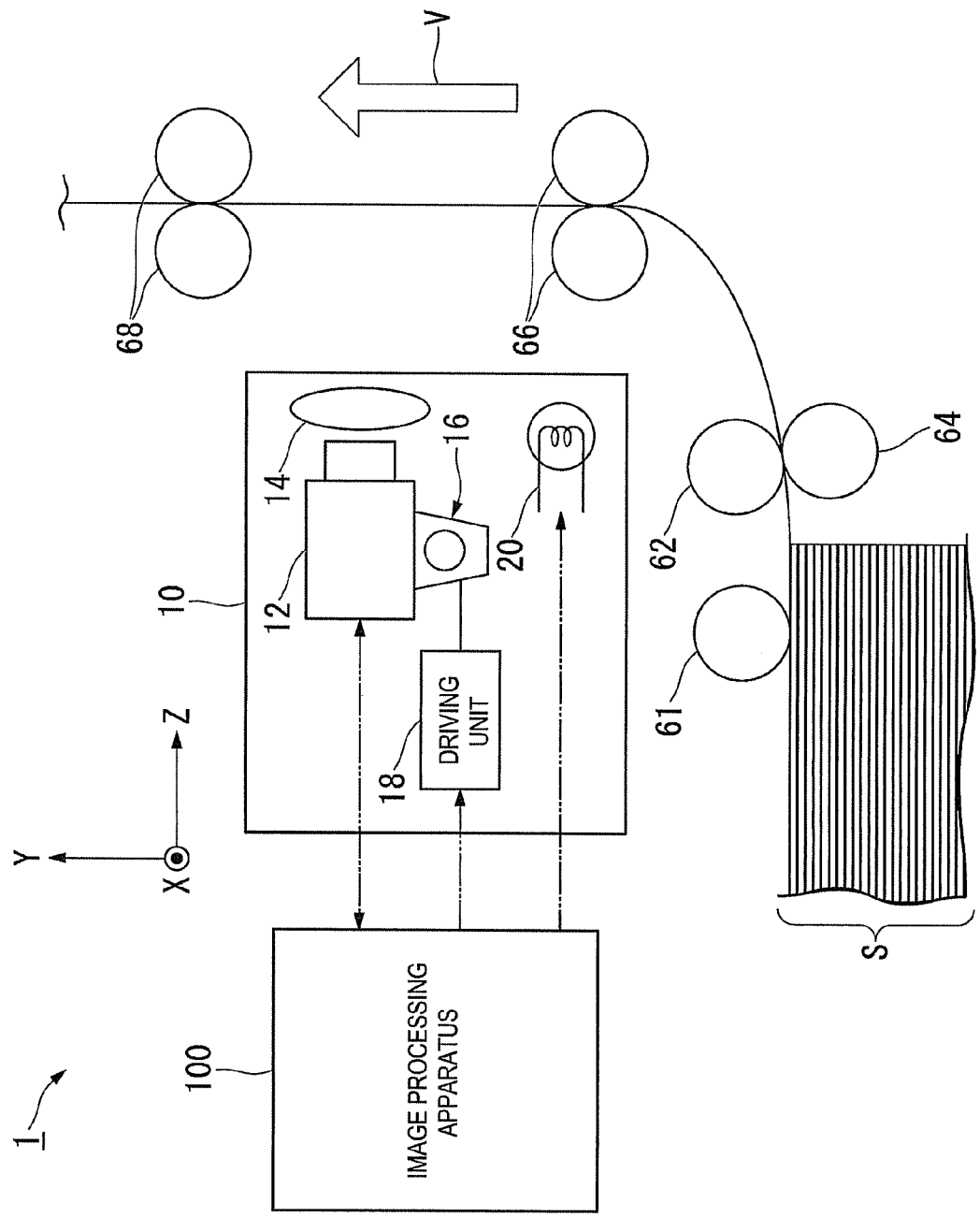
FIG. 2 is a diagram for explaining an example of the configuration of the image forming apparatus centering on an image reading unit.

FIG. 2 is a diagram for explaining an example of the configuration of the image forming apparatus 1 centering on the image reading unit 10. The image reading unit 10 includes an image pickup device 12, a lens 14, a driving mechanism 16, a driving unit 18, and a light 20. The light 20 is an example of an "irradiating unit".

A conveying unit 60 explained below drives a conveying mechanism and conveys the sheet S to a predetermined position in the image forming apparatus 1. For example, the conveying mechanism includes a pickup roller 61, a paper feeding roller 62, a separating roller 64, pre-reading rollers 66, and post-reading rollers 68.

For example, the pickup roller 61 conveys the sheets S placed one on top of another to a conveying route in order from the sheets S on the upper side (in a Y direction in the figure).

The paper feeding roller 62 conveys the sheet S conveyed by the pickup roller 61 to a conveying route on the side of the pre-reading rollers 66 and the post-reading rollers 68. The separating roller 64 is arranged in a position opposed to the paper feeding roller 62. Note that an arrangement interval between the paper feeding roller 62 and the separating roller 64 is an interval equivalent to the thickness of one sheet S. The separating roller 64 rotates in a direction opposite to a rotating direction of the paper feeding roller 62. Consequently, the separating roller 64 separates the sheet S in contact with the separating roller 64 and one sheet S in contact with the paper feeding roller 62. As a result, even if a plurality of the sheets S overlap, it is possible to convey only one sheet S to a conveying route at a later stage.

The driving unit 18 drives the driving mechanism 16 and adjusts the positions of the image pickup device 12 and the lens 14. The position indicates a position in a three-dimensional space represented by X-Y-Z in the figure. For example, the driving unit 18 is an actuator such as a motor. The driving unit 18 drives the driving mechanism 16 according to a control signal output from the image processing apparatus 100. Specifically, the driving unit 18 adjusts an optical axis of the image pickup device 12 and the lens 14 to be located on a predetermined conveying route. The predetermined conveying route is a section between the pre-reading rollers 66 and the post-reading rollers 68. Note that the driving unit 18 may adjust the position of the entire image reading unit 10 including the light 20.

The lens 14 condenses, on the surface of the sheet S, reflected light of light irradiated from the light 20. The reflected light condensed by the lens 14 is received by the image pickup device 12. As a result, the image pickup device 12 generates sheet image data. Note that the light condensed by the lens 14 may include not only the reflected light of the light irradiated from the light 20 but also other lights. For example, the other lights are sunlight, the light irradiated from the light 20, and illumination light of a room where the image forming apparatus 1 is placed. Note that the light 20 is suitably a point light source or a light source similar to the point light source.

Summarizing the above, with the configuration of the image reading unit 10, the image pickup device 12 can pick up an image of the sheet S conveyed in a direction of an arrow V shown in the figure.

Figure 3:
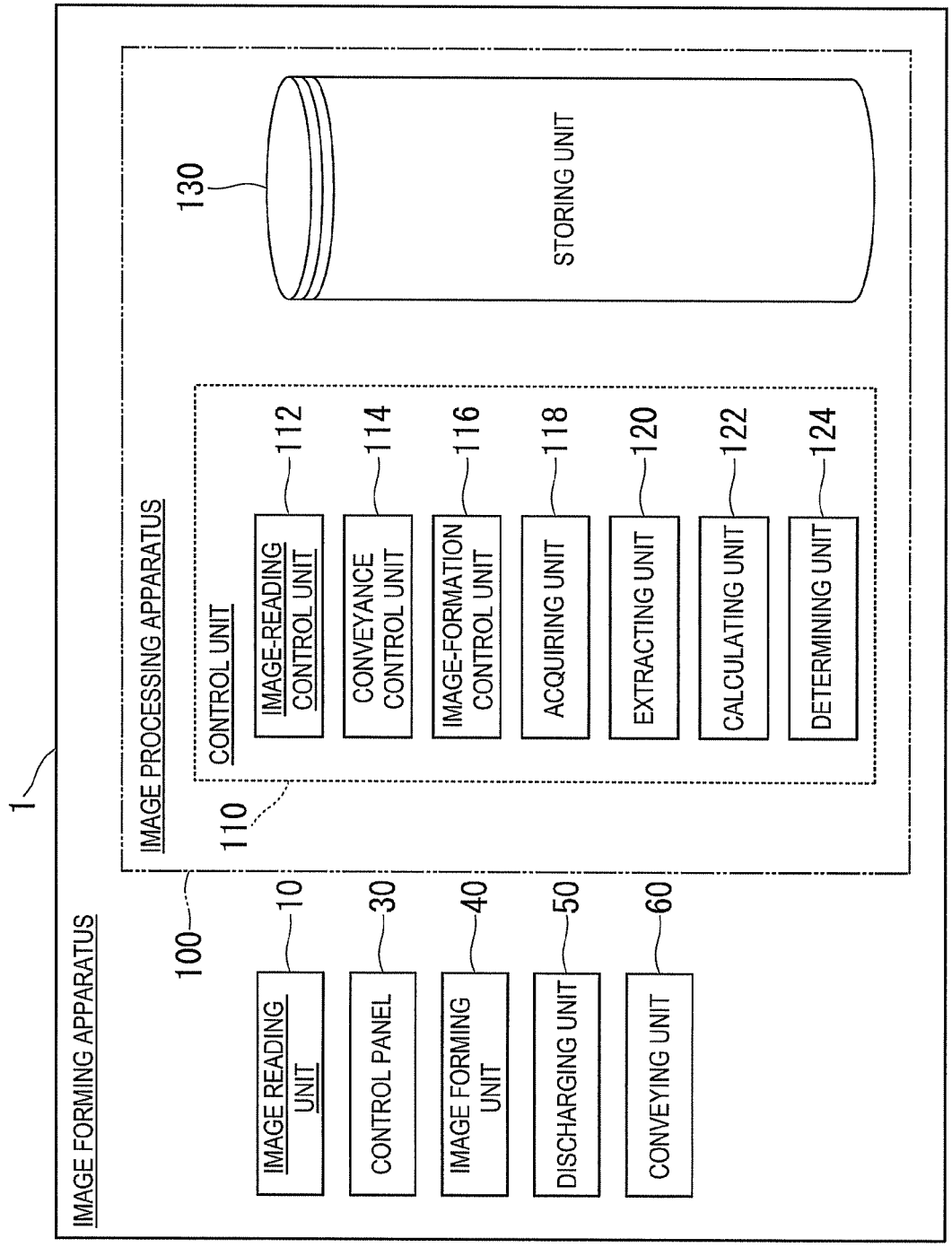
FIG. 3 is a diagram showing an example of the functional configuration of the image forming apparatus including the image processing apparatus in the first embodiment.

FIG. 3 is a diagram showing an example of the functional configuration of the image forming apparatus 1 including the image processing apparatus 100 in the first embodiment.

A discharging unit 50 discharges the sheet S conveyed by the conveying unit 60 to the outside of the image forming apparatus 1. For example, the discharging unit 50 is a so-called finisher.

The image processing apparatus 100 includes a control unit 110 and a storing unit 130. The control unit 110 includes an image-reading control unit 112, a conveyance control unit 114, an image-formation control unit 116, an acquiring unit 118, an extracting unit 120, a calculating unit 122, and a determining unit 124. Note that the calculating unit 122 and the determining unit 124 are examples of a "determining unit".

A part or all of the functional units of the control unit 110 are software functional units. The software functional units function when a processor executes a computer program stored in the storing unit 130. For example, the processor is a CPU (Central Processing Unit). A part or all of the functional units of the control unit 110 may be hardware functional units. For example, the hardware functional unit is an LSI or an ASIC. The LSI is an abbreviation of "Large Scale Integration". The ASIC is an abbreviation of "Application Specific Integrated Circuit".

The image-reading control unit 112 controls the image reading unit 10. For example, the image-reading control unit 112 controls timing of reading of the sheet S by the image reading unit 10. For example, the image-reading control unit 112 controls a reading position of the image reading unit 10. Specifically, the image-reading control unit 112 generates a control signal for controlling the driving unit 18. The image-reading control unit 112 outputs the generated control signal to the driving unit 18. Consequently, the image reading unit 10 changes the position as appropriate on the three-dimensional space. For example, the image-reading control unit 112 controls the light 20 in the image reading unit 10. Specifically, the image-reading control unit 112 controls the light 20 to be lit and controls the light 20 to be extinguished.

Figure 4:
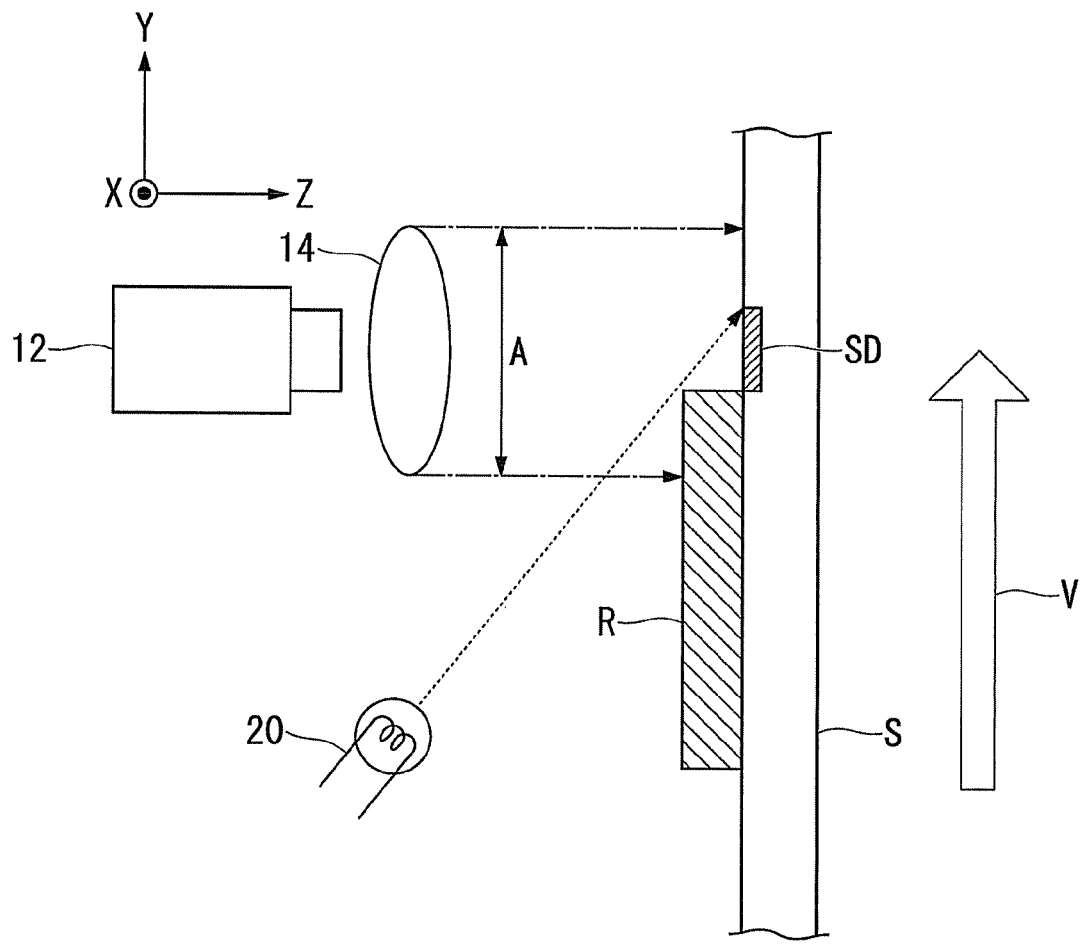
FIG. 4 is a diagram for explaining a control method for an image-reading control unit.

The control of the image-reading control unit 112 is explained with reference to FIGS. 4 and 5. FIG. 4 is a diagram for explaining a control method for the image-reading control unit 112.

For example, the image-reading control unit 112 controls the position of the light 20 such that the light 20 irradiates light on the surface of the sheet S from a predetermined incident angle. For example, the predetermined incident angle is approximately 60°. That is, the image-reading control unit 112 controls the position of the light 20 such that the light 20 irradiates light on the surface of the sheet S from an oblique direction. Consequently, if a label R is stuck to the surface of the sheet S, a shadow SD corresponding to the thickness of the label R is formed on the surface of the sheet S as a projected image. The image-reading control unit 112 controls the position of the image reading unit 10 such that the shadow SD is included in a reading region A of the image reading unit 10.

Figure 5:
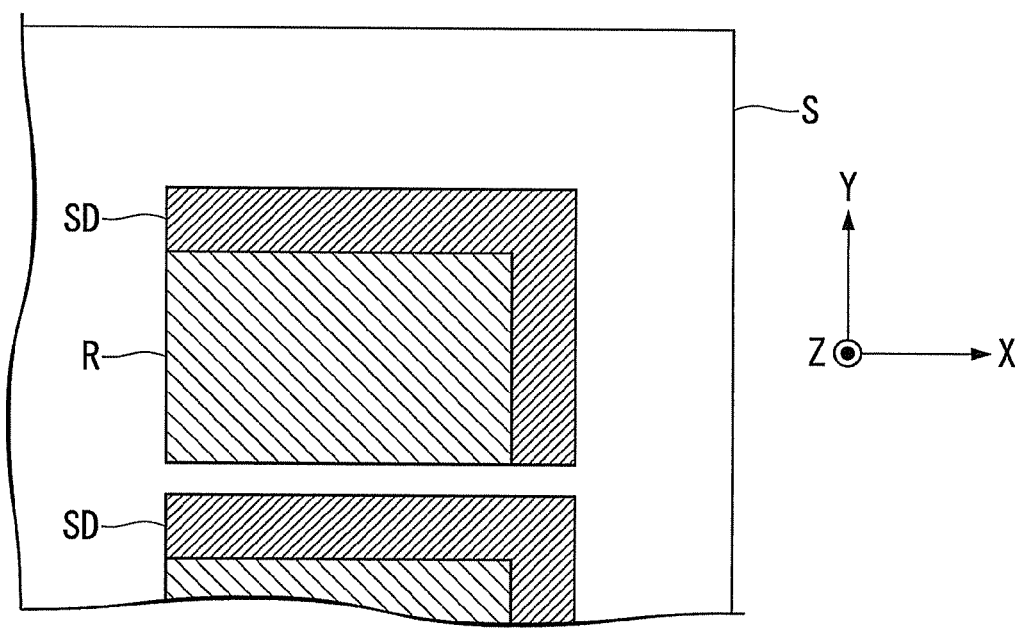
FIG. 5 is a diagram showing a state of the surface of a sheet with respect to a control result of the image reading unit by the image-reading control unit.

FIG. 5 is a diagram showing a state of the surface of the sheet S with respect to a control result of the image reading unit 10 by the image-reading control unit 112. For example, in the case of an example shown in FIG. 5, the image-reading control unit 112 controls the light 20 to irradiate light from a downward direction to an oblique right upward direction in the figure. In such a case, the shadow SD is formed on the surface of the sheet S to cover two sides of the label R. Consequently, edge extraction processing of the extracting unit 120 explained below can be suitably performed.

FIG. 6 is a diagram showing a state in reading the sheet S on the predetermined conveying route. For example, in the case of FIG. 6, a plurality of labels R having different sizes are stuck to the surface of the sheet S. The image-reading control unit 112 controls the position of the image reading unit 10 such that a corner of the sheet S and a part of a road surface B of the predetermined conveying route are included in the reading region A. For example, the image-reading control unit 112 controls the position of the image reading unit 10 such that the reading region A overlaps the position at the right corner of the sheet S in the figure.

The explanation is continued with reference to FIG. 3 again.

The conveyance control unit 114 controls the conveying unit 60. For example, the conveyance control unit 114 controls conveying speed of the sheet S. For example, the conveyance control unit 114 switches, according to the sheet S, the conveying route on which the sheet S is conveyed. Consequently, for example, the conveying unit 60 can convey the sheet S read by the image reading unit 10 to the image forming unit 40. In the following explanation, control for conveying the sheet S read by the image reading unit 10 to the image forming unit 40 is described as "normal conveyance control".

For example, the discharging unit 50 discharges the sheet S, on which the image is formed by the image forming unit 40, to the outside of the image forming apparatus 1.

The image-formation control unit 116 controls the image forming unit 40. For example, the image-formation control unit 116 controls, according to a determination result of the determining unit 124, the image forming unit 40 to form an image on the sheet S. Specifically, if the determining unit 124 determines that the label R is stuck on the sheet S, the image-formation control unit 116 performs processing explained below. The image-formation control unit 116 controls the image forming unit 40 to form an image on the label R. In this case, the image-formation control unit 116 controls the position of a formation region of the image on the basis of the position of the label R calculated by the calculating unit 122 explained below.

The acquiring unit 118 acquires sheet image data from the image reading unit 10. The acquiring unit 118 acquires an operation signal from the control panel 30. The acquiring unit 118 may acquire various image data from an external apparatus via a not-shown interface. The acquiring unit 118 causes the storing unit 130 to store the sheet image data, the operation signal, or the image data acquired as explained above.

The extracting unit 120 extracts an edge indicating the contour of the sheet S from the sheet image data acquired by the acquiring unit 118. In this embodiment, the edge indicates a place where gradation of brightness suddenly changes in the image data. Note that the edge may be a place where a color suddenly changes. The edge indicating the contour of the sheet S includes an edge in the horizontal direction with respect to a conveying direction of the sheet S and an edge in the vertical direction with respect to the conveying direction of the sheet S. In the following explanation, the edge in the horizontal direction included in the edge indicating the contour of the sheet S is described as "horizontal edge HE1". The edge in the vertical direction included in the edge indicating the contour of the sheet S is described as "vertical edge VE1".

The extracting unit 120 extracts an edge indicating the contour of the label R from the sheet image data acquired by the acquiring unit 118. Like the edge indicating the contour of the sheet S, the edge indicating the contour of the label R includes an edge in the horizontal direction and an edge in the vertical direction with respect to the conveying direction of the sheet S. In the following explanation, the edge in the horizontal direction included in the edge indicating the contour of the label R is described as "horizontal edge HE2". The edge in the vertical direction included in the edge indicating the contour of the label R is described as "vertical edge VE2". In the following explanation, the horizontal edge HE1, the vertical edge VE1, the horizontal edge HE2, and the vertical edge VE2 are collectively described as "edge group" if the edges are not particularly distinguished from one another.

A specific extraction method for the edge group is explained below.

The extracting unit 120 extracts a luminance value for each of pixels configuring the sheet image data. In extracting the luminance value, the extracting unit 120 focuses on any pixel of the sheet image data. In the following explanation, the pixel focused on by the extracting unit 120 is described as "target pixel". The extracting unit 120 calculates a difference between a luminance value of the target pixel and a luminance value of pixels around the target pixel. The extracting unit 120 compares a value of the calculated difference and a threshold. For example, if the value of the calculated difference exceeds the threshold, the extracting unit 120 allocates "1". If the value of the calculated difference is equal to or smaller than the threshold, the extracting unit 120 allocates "0". That is, the extracting unit 120 converts the target pixel into a binary value "1" or "0" according to the value of the calculated difference. If a fixed number or more of pixels that take any one value among the pixels converted into the binary values are continuous, the extracting unit 120 joins the continuous pixels. The extracting unit 120 extracts the joined pixels as an edge.

For example, the extracting unit 120 extracts an edge group using a SOBEL operator as a method of calculating the difference between the luminance values. Note that the extracting unit 120 may use a PREWITT operator or other operators instead of the SOBEL operator.

The extracting unit 120 may extract an edge group using a zero-crossing method. For example, the extracting unit 120 secondarily differentiates a change in the luminance values on the sheet image data. The extracting unit 120 extracts a position P1 where the secondarily-differentiated luminance value crosses zero when the luminance value changes from a positive peak to a negative peak. The extracting unit 120 extracts a position P2 where the secondarily-differentiated luminance value crosses zero when the luminance value changes from the negative peak to the positive peak. The extracting unit 120 extracts the edge group using Hough transform on the basis of a pixel indicated by the extracted position P1 and a pixel indicated by the extracted position P2.

The extracting unit 120 may smooth the luminance value of the entire sheet image data before extracting the edge group using the zero-cross method. For example, the extracting unit 120 applies a Gaussian filter to the sheet image data and smoothes the luminance value of the entire sheet image data. For example, the extracting unit 120 extracts the edge group using a Canny method as a method of performing the smoothing beforehand. Consequently, the extracting unit 120 can remove noise when extracting the edge group.

FIG. 7 is a diagram showing an example of sheet image data obtained by representing pixels in binary values as a processing result of the extracting unit 120. For example, the extracting unit 120 converts pixels in a region on the road surface B into "0" in the sheet image data. For example, the extracting unit 120 converts pixels in a region of the sheet S into "1" in the sheet image data. For example, the extracting unit 120 converts pixels in a region of the shadow SD of the label R into "0" in the sheet image data.

By performing the processing explained above, the extracting unit 120 extracts a boundary between the sheet S and the road surface B of the predetermined conveying route as the horizontal edge HE1 or the vertical edge VE1. The extracting unit 120 extracts a boundary between the sheet S and the label R as the horizontal edge HE2 or the vertical edge VE2.

The calculating unit 122 calculates a pixel region indicating the size of the sheet S in the sheet image data. For example, the calculating unit 122 calculates a pixel region of the sheet S on the basis of the position of the horizontal edge HE1, conveying speed, and an actual size of the sheet S. The conveying speed is speed in conveying the sheet S by the conveying unit 60. The actual size of the sheet S is detected by a predetermined sensor when the sheet S is conveyed on the conveying route of the conveying unit 60.

More specifically, the calculating unit 122 sets the horizontal edge HE1 as a reference and calculates the position of the terminal end of the sheet S on the sheet image data. The position of the terminal end is a position equivalent to the opposite side of the side indicated by the horizontal edge HE1 if it is assumed that the sheet S has a square shape. Consequently, the calculating unit 122 calculates a pixel region between the horizontal edge HE1 and the terminal end as a pixel region indicating the size of the sheet S. Note that the calculating unit 122 may calculate the pixel region of the sheet S using the position of the vertical edge VE1. The calculating unit 122 may calculate the pixel region of the sheet S using both the positions of the horizontal edge HE1 and the vertical edge VE1. In this case, the calculating unit 122 can more accurately calculate the pixel region of the sheet S.

The calculating unit 122 calculates, on the basis of the horizontal edge HE2 and the vertical edge VE2, a position where the label R is stuck. For example, the calculating unit 122 forms a square on data using an intersection of both the edges HE2 and VE2 and edge lengths of both the edges HE2 and VE2. The calculating unit 122 calculates an internal region of the square as a pixel region of the label R. The calculating unit 122 calculates the position where the label R is stuck from a positional relation between the pixel region of the label R and the pixel region of the sheet S.

The determining unit 124 determines, on the sheet image data, whether the horizontal edge HE2 or the vertical edge VE2 is included in the pixel region of the sheet S. If the horizontal edge HE2 or the vertical edge VE2 is included, the determining unit 124 determines that the label R is stuck on the sheet S. If the horizontal edge HE2 or the vertical edge VE2 is not included, the determining unit 124 determines that the label R is not stuck on the sheet S. In the following explanation, a state in which the label R is stuck on the sheet S is described as "the label R is present". A state in which the label R is not stuck on the sheet S is described as "the label R is absent.

The storing unit 130 includes a nonvolatile storage medium and a volatile storage medium. For example, the nonvolatile storage medium is a ROM, a flash memory, or a HDD. The ROM is an abbreviation of "Read Only Memory". The HDD is an abbreviation of "Hard Disk Drive". For example, the volatile storage medium is a RAM or a register. The RAM is an abbreviation of "Random Access Memory". Information stored in the storing unit 130 includes the sheet image data, the edge group, the position of the label R, the pixel region of the sheet S, and the determination result of the determining unit 124.

Figure 9:
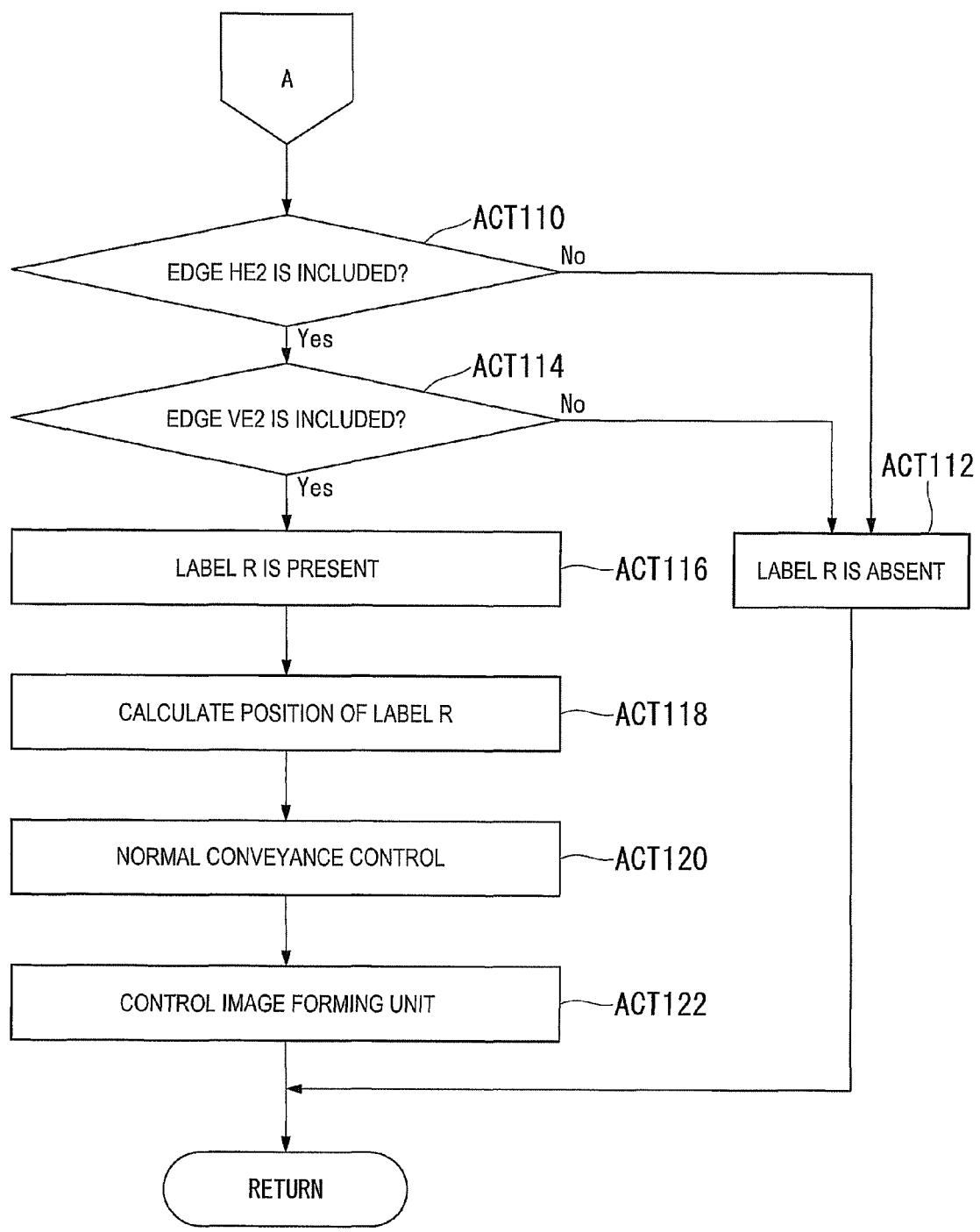
FIG. 9 is a flowchart for explaining an example of a flow of a partial operation of the image processing apparatus in the first embodiment.

A flow of the operation of the image processing apparatus 100 in the first embodiment is explained below with reference to FIGS. 8 and 9. FIGS. 8 and 9 are flowcharts for explaining examples of flows of partial operations of the image processing apparatus 100 in the first embodiment. For example, the image processing apparatus 100 in this embodiment performs processing of the flowcharts at a predetermined cycle.

First, the image-reading control unit 112 controls the image reading unit 10 (ACT 100). Subsequently, the acquiring unit 118 acquires sheet image data from the image reading unit 10 (ACT 102).

Subsequently, the extracting unit 120 extracts the horizontal edge HE1 from the sheet image data acquired by the acquiring unit 118 (ACT 104). Subsequently, the extracting unit 120 extracts the vertical edge VE1 from the sheet image data acquired by the acquiring unit 118 (ACT 106). Note that the image processing apparatus 100 may perform the action in ACT 106 before the action in ACT 104.

Subsequently, the calculating unit 122 calculates a pixel region of the sheet S using both of the horizontal edge HE1 and the vertical edge VE1 (ACT 108).

Subsequently, the determining unit 124 determines whether the horizontal edge HE2 is included in the pixel region of the sheet S calculated by the calculating unit 122 (ACT 110). If the horizontal edge HE2 is not included (NO in ACT 110), the determining unit 124 determines that "the label R is absent" (ACT 112). Consequently, the image processing apparatus 100 ends the processing of the flowcharts.

If the horizontal edge HE2 is included (YES in ACT 110), the determining unit 124 performs determination explained below. The determining unit 124 determines whether the vertical edge VE2 is included in the pixel region of the sheet S (ACT 114). If the vertical edge VE2 is not included (NO in ACT 114), the determining unit 124 determines that "the label R is absent" (ACT 112). Consequently, the image processing apparatus 100 ends the processing of the flowcharts. Note that the image processing apparatus 100 may perform the action in ACT 114 before the action in ACT 110.

If the vertical edge VE2 is included (YES in ACT 114), the determining unit 124 determines that the label R is present (ACT 116). The calculating unit 122 calculates the position of the label R (ACT 118).

Subsequently, the conveyance control unit 114 controls the conveying unit 60 with a method of normal conveyance control (ACT 120). That is, the conveyance control unit 114 controls the conveying unit 60 to convey the sheet S read by the image reading unit 10 to the image forming unit 40.

The image-formation control unit 116 controls, on the basis of the position of the label R, the image forming unit 40 to form an image on the label R (ACT 122). Consequently, the image processing apparatus 100 ends the processing of the flowcharts.

In the image processing apparatus 100 in the first embodiment explained above, the image reading unit 10 reads the sheet S and generates sheet image data. The determining unit 124 determines, on the basis of a luminance value of the sheet image data, whether a label is stuck on the sheet S, which is a reading target. As a result, the image processing apparatus 100 can distinguish a sheet to which an object is stuck and a sheet to which the object is not stuck.

In the image processing apparatus 100 in the first embodiment, the calculating unit 122 calculates the position of the label R on the sheet image data. Consequently, the image forming apparatus 1 can form a predetermined image in the position of the label R on the sheet S.

The image processing apparatus 100 in a second embodiment is explained below. The image processing apparatus 100 in the second embodiment is different from the image processing apparatus 100 in the first embodiment in that, if the label R is stuck on the sheet S, the sheet S is discharged to the outside of the image forming apparatus 1. This difference is mainly explained. Explanation of similarities to the first embodiment is omitted.

The conveyance control unit 114 controls, according to a determination result of the determining unit 124, the conveying unit 60 to convey the sheet S read by the image reading unit 10 to the discharging unit 50. In the following explanation, the control for conveying the sheet S read by the image reading unit 10 to the discharging unit 50 is described as "discharge conveyance control". Specifically, if the determining unit 124 determines that the label R is stuck on the sheet S, the conveyance control unit 114 performs the discharge conveyance control. If the determining unit 124 determines that the label R is not stuck on the sheet S, the conveyance control unit 114 performs the normal conveyance control.

Figure 10:
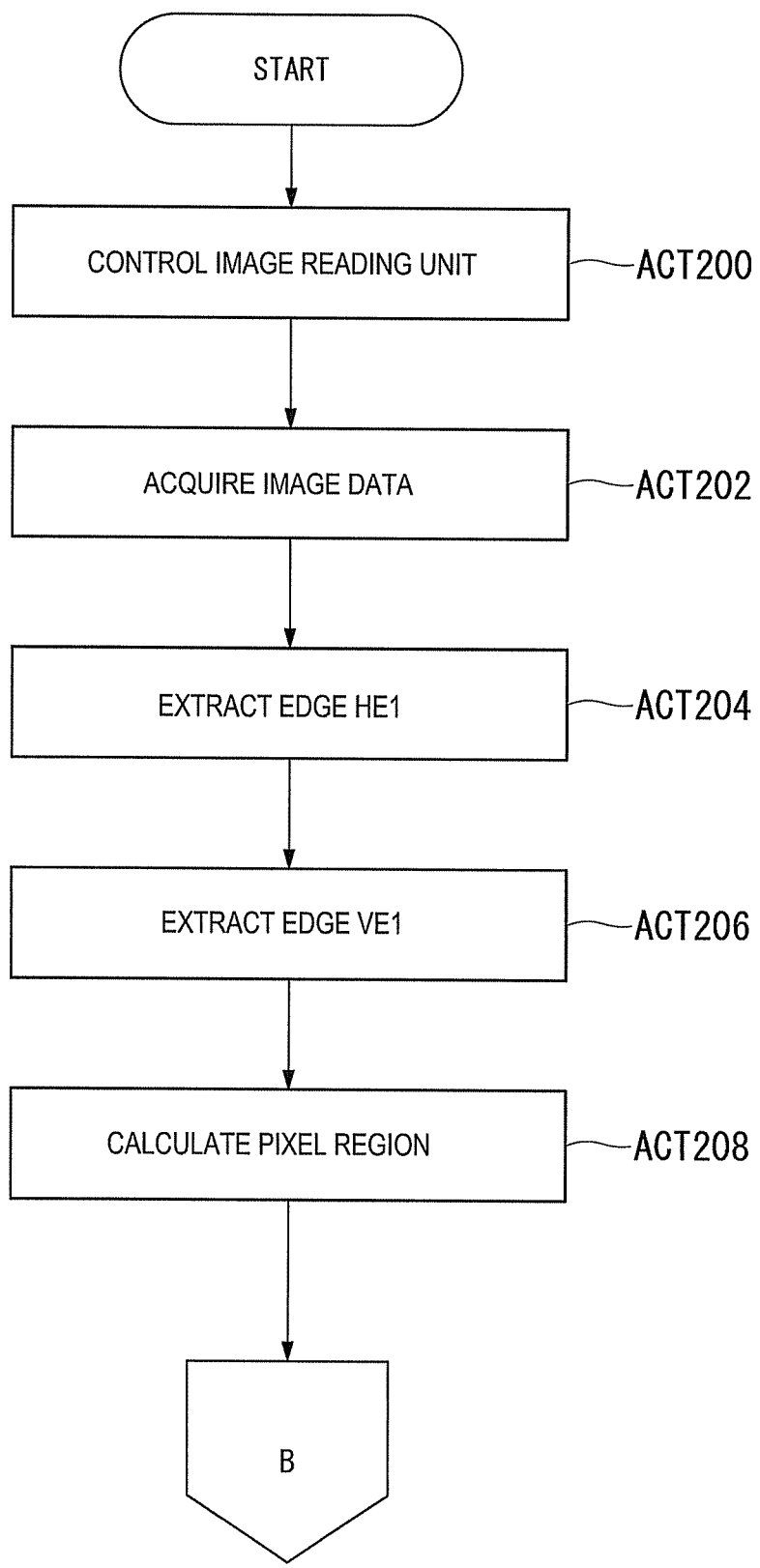
FIG. 10 is a flowchart for explaining an example of a flow of a partial operation of an image processing apparatus in a second embodiment.
Figure 11:
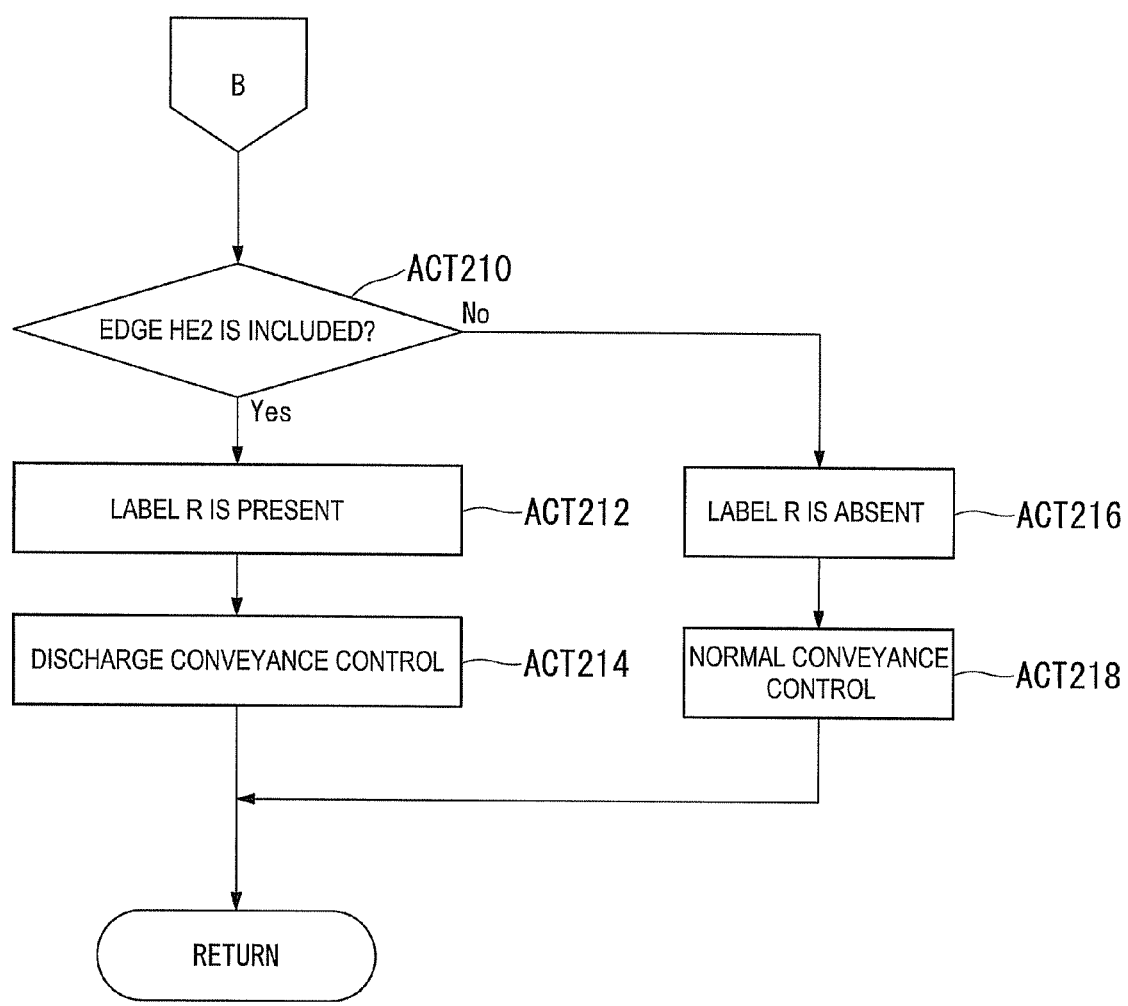
FIG. 11 is a flowchart for explaining an example of a flow of a partial operation of the image processing apparatus in the second embodiment.

A flow of the operation of the image processing apparatus 100 in the second embodiment is explained below with reference to FIGS. 10 and 11. FIGS. 10 and 11 are flowcharts for explaining examples of flows of partial operations of the image processing apparatus 100 in the second embodiment.

First, the image-reading control unit 112 controls the image reading unit 10 (ACT 200). Subsequently, the acquiring unit 118 acquires sheet image data from the image reading unit 10 (ACT 202).

Subsequently, the extracting unit 120 extracts the horizontal edge HE1 from the sheet image data acquired by the acquiring unit 118 (ACT 204). Subsequently, the extracting unit 120 extracts the vertical edge VE1 from the sheet image data acquired by the acquiring unit 118 (ACT 206). Note that the image processing apparatus 100 may perform the action in ACT 206 before the action in ACT 204.

Subsequently, the calculating unit 122 calculates a pixel region of the sheet S using both of the horizontal edge HE1 and the vertical edge VE1 (ACT 208).

Subsequently, the determining unit 124 determines whether the horizontal edge HE2 is included in the pixel region of the sheet S calculated by the calculating unit 122 (ACT 210). If the horizontal edge HE2 is included (YES in ACT 210), the determining unit 124 determines that "the label R is present" (ACT 212).

Subsequently, the conveyance control unit 114 controls the conveying unit 60 with a method of discharge conveyance control (ACT 214). That is, the conveyance control unit 114 controls the conveying unit 60 to convey the sheet S read by the image reading unit 10 to the discharge unit 50. Consequently, the image processing apparatus 100 ends the processing of the flowcharts.

If the horizontal edge HE2 is not included (NO in ACT 210), the determining unit 124 determines that "the label R is absent" (ACT 216).

Subsequently, the conveyance control unit 114 controls the conveying unit 60 with a method of normal conveyance control (ACT 218). That is, the conveyance control unit 114 controls the conveying unit 60 to convey the sheet S read by the image reading unit 10 to the image forming unit 40. Consequently, the image processing apparatus 100 ends the processing of the flowcharts.

With the image processing apparatus 100 in the second embodiment explained above, the image processing apparatus 100 can discharge the sheet S, to which a label is stuck, to the outside of the apparatus. As a result, the image processing apparatus 100 can suppress the apparatus from being broken down because the label R peels in the conveying mechanism and accumulates on the inside. Further, the image processing apparatus 100 can suppress a paper jam from occurring because of the thickness of the label R.

Note that a part of the functions of the image processing apparatus 100 in the embodiments may be realized by a computer. In that case, a computer program for realizing the functions is recorded in a computer-readable recording medium. The functions may be realized by causing the computer system to read the computer program recorded in the recording medium and executing the computer program.

Note that the "computer system" includes an operating system and hardware such as peripheral apparatuses. The "computer-readable recording medium" refers to a portable medium, a storage device, or the like. The portable medium is a flexible disk, a magneto-optical disk, a ROM, a CD-ROM, or the like. The storage device is a hard disk or the like incorporated in the computer system. The "computer-readable recording medium" is a recording medium that dynamically stores a computer program for a short time like a communication line in transmitting the computer program via a communication line. The communication line is a network such as the Internet, a telephone line, or the like. The "computer-readable recording medium" may be a volatile memory inside the computer system functioning as a server or a client. The volatile memory stores a computer program for a fixed time. The computer-program may be a computer program for realizing a part of the functions explained above. The computer program may be able to realize the functions in combination with a computer program already recorded in the computer system.

According to at least one embodiment explained above, the image reading unit 10 reads the sheet S and generates sheet image data. The determining unit 124 determines, on the basis of a luminance value of the sheet image data, whether a label is stuck on the sheet S, which is a reading target. As a result, the image processing apparatus 100 can distinguish a sheet to which an object is stuck and a sheet to which the object is not stuck.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
 a feeder configured to feed a sheet;
 a conveying unit configured to convey the sheet that has been fed by the feeder;
 an image forming unit configured to form an image on the sheet that has been conveyed by the conveying unit;
 an image reading unit configured to perform, before the sheet is conveyed to the image forming unit by the conveying unit, a reading operation for the sheet, which is being conveyed by the conveying unit, to generate sheet image data;
 a determining unit configured to determine, on the basis of a degree of gradation in the sheet image data generated from the read operation performed by the image reading unit, whether there is a planar object on the sheet read, the planar object being a three-dimensional and tangible object; and
 a control unit configured to control the image forming unit to form an image on the planar object on the sheet, if the determining unit determines that the planar object is on the sheet.

2. The apparatus according to claim 1, further comprising an extracting unit configured to extract, on the basis of the degree of the gradation, from the sheet image data, an edge indicating a shadow with respect to thickness of the planar object projected on the sheet, wherein the determining unit determines, on the basis of the edge extracted by the extracting unit, whether the planar object is on the sheet.

3. The apparatus according to claim 2, wherein, the determining unit is configured to determine a position of the planar object on the sheet on the basis of the edge extracted by the extracting unit, if the determining unit determines that the planar object is on the sheet.

4. The apparatus according to claim 2, further comprising:
a conveying unit configured to convey the sheet; and
a conveyance control unit configured to control, if it is determined that the planar object is on the sheet, the conveying unit to discharge the sheet to an outside of the apparatus.

5. The apparatus according to claim 2, wherein the extracting unit extracts, from the sheet image data, as the edge, at least any one of a horizontal edge indicating an edge in a horizontal direction with respect to a conveying direction of the sheet and a vertical edge indicating an edge in a vertical direction with respect to the conveying direction of the sheet.

6. The apparatus according to claim 2, wherein the extracting unit converts, for each of pixels, the degree of the gradation in the sheet image data generated from the read operation into binary values and, if a predetermined number or more of pixels that take any one value of the converted binary values are continuous, extracts the continuous predetermined number or more of pixels as the edge.

7. The apparatus according to claim 2, wherein
the extracting unit extracts, on the basis of both of the degree of the gradation of the sheet and a degree of gradation of a background in which the sheet is placed, an edge indicating a contour of the sheet read by the reading unit, and
the apparatus further comprises a calculating unit configured to calculate, on the basis of conveying speed in conveying the sheet read by the reading unit and the edge indicating the contour of the sheet extracted by the extracting unit, on the sheet image data, a pixel region indicating a size of the sheet read by the reading unit.

8. The apparatus according to claim 7, wherein the determining unit determines, on the sheet image data, whether an edge indicating a shadow with respect to thickness of the planar object projected on the sheet is included in the pixel region calculated by the calculating unit and, if the edge indicating the shadow with respect to the thickness of the planar object is included in the pixel region, determines that the planar object adheres on the sheet.

9. The apparatus according to claim 1, further comprising an irradiating unit configured to irradiate light to a surface of a sheet, which is a reading target of the reading unit, from a predetermined incident angle.

\* \* \* \* \*